United States Patent [19]

Robins

[11] Patent Number: 4,762,356

[45] Date of Patent: Aug. 9, 1988

[54] ENDER AND CHOKER HOOK FOR LOGGING RIGGING

[76] Inventor: David J. Robins, E. 10420 Mission Ave., Spokane, Wash. 99206

[21] Appl. No.: 938,712

[22] Filed: Dec. 4, 1986

[51] Int. Cl.$^4$ ............................................. B66C 1/14
[52] U.S. Cl. ................................. 294/82.14; 403/353
[58] Field of Search .................... 294/74, 82.1–82.14, 294/82.17; 24/115 R, 128, 129 R, 230.5 R, 230.5 TP; 403/301, 353

[56] References Cited

U.S. PATENT DOCUMENTS

| | | | |
|---|---|---|---|
| 1,675,778 | 7/1928 | Wirkkala | 294/74 |
| 2,533,905 | 12/1950 | Aconley | 294/74 |
| 2,905,993 | 9/1959 | Wernsing et al. | 294/82.14 |
| 3,058,184 | 10/1962 | Ritzheimer | 294/82.14 X |
| 3,066,371 | 12/1962 | Mullens | 294/74 X |
| 3,276,809 | 10/1966 | Vaines et al. | 294/82.14 X |
| 3,289,259 | 12/1966 | Laharty | 294/74 X |
| 4,118,059 | 10/1978 | Lindsay | 294/82.14 X |
| 4,323,273 | 4/1982 | Sword | 294/82.14 |
| 4,540,209 | 9/1985 | Cody | 294/74 |

Primary Examiner—Johnny D. Cherry
Attorney, Agent, or Firm—Keith S. Bergman

[57] ABSTRACT

An ender and bunching type choker hook are disclosed for use with a hauling cable to releasably interconnect a plurality of choker cables therewith. The choker hook provides an eye for slidable engagement on a hauling cable and an interconnecting, angularly oriented body defining a spatially skewed, key type slot for releasably fastening the ferruled end of a choker cable, upon particular manipulation for placement or release. The ender comprises a choker hook eye and body with a fastening structure carried in the eye to define an orifice that allows sliding motion of a hauling cable therethrough but does not allow passage of a ferrule end of that cable.

4 Claims, 2 Drawing Sheets

ENDER AND CHOKER HOOK FOR LOGGING RIGGING

BACKGROUND OF INVENTION

Related Applications

There are no applications related hereto heretofore filed in this or any foreign country.

FIELD OF INVENTION

My invention relates generally to rigging apparatus for log hauling and more particularly to a bunching type choker hook and a similarly configured ender.

BACKGROUND AND DESCRIPTION OF PRIOR ART

In the logging industry generally, and especially in the Western part of the United States, it is common to use particular rigging to haul a plurality of logs at one time to a staging, decking or loading area. To accomplish this a winch or hauling line is provided with a plurality of slidably carried fastening members, commonly called 'bunching hooks' or 'choker hooks', each to releasably fasten a choker cable that attaches a log to be transported. A so-called 'ender' is provided at the end of a hauling line to maintain the choker hooks on that line and prevent them from moving rearwardly off the end thereof.

This general system of logging rigging has been long used and during that use the system has developed a fair degree of sophistication. Ontologically the original device serving the purpose of a choker hook comprised a simple ring or merely one cable knotted to or about another. Through the evolutionary period of the device it was learned that a choker hook that is slidably carried on a pulling cable and one that may releasably fasten a choker cable was preferable as being of greatest convenience and safety. During the same evolutionary period it similarly was found that a cylindrical ferrule about the end of a choker cable provided the most efficient and simplest means for releasably fastening the cable end to the hook structure. During the course of this development, many and various choker hooks and enders have become known. Such devices today have quite uniformly devolved into a choker hook structure providing an eye for slidable carriage on a hoisting cable with a structurally attached body providing a keyway-type slot to releasably receive and hold the ferruled end of a choker cable. The instant invention provides a new and novel member of this class of device.

An ender provides some structure at the end of a cable to prevent the passage of choker hooks thereover and thusly maintain them on the hauling cable. Originally a simple knot or enlargement at the end of a hauling cable served this purpose, but as the art developed it was found to be more convenient and safer to use a separate structure for this purpose. The instant invention provides an ender structure that is essentially a choker hook with a web in the cable eye to prevent passage of the structure over the ferruled end of a hoisting cable.

For a choker hook to be effective it must allow ready release of a choker cable when there be slack in that cable so as to allow easy detachment of logs either at a loading area or during the course of transit should they become fouled. At the same time this fastening must be sure and certain when the cable be tight to allow appropriate hauling and prevent accidents and injuries to workmen. Choker hooks heretofore known have generally allowed releasable attachment of ferruled choker cables, but none have provided a completely safe fastening system which will prevent accidental dislodgement of a choker cable from a hook during use. My invention provides a hook which requires a motion of the ferruled end of a choker cable in reverse from its normal course to allow unfastening and thusly assures almost certainly that there may be no accidental dislodgement of a choker cable end from the hook. Releasing of the choker cable, however, by deliberate manipulation is as simple and easy as with other choker hooks commonly used in the present day logging arts.

My hook further provides a hoisting cable eye structure that is angled to the axis of a cylindrical body wherein a choker cable is carried to allow ready and appropriate bunching of choker hooks adjacent a hoisting cable end without undo harm to the hoisting cable. The hooks are so configured that one may rest immediately against another with the rearwardmost hook immediately adjacent an ender so as to aid in preventing cable kinking and end wear which not only shortens cable life but also provides substantial risks for accidental injury to logging workers.

My choker hook is of a relatively small, compact nature and of a streamlined configuration to prevent or substantially lessen the probability of catching on structures over which it passes during log transport. The device similarly is of relatively low mass for its strength to provide a device that is quite strong enough to perform its function but yet light enough so as not to be an unnecessary burden to a logger who must continually carry a plurality of the devices to a point of use.

My ender differs from the prior art firstly in using the same essential type of structure as used for the choker hook to reduce costs and still provide an efficient structure. An ordinary choker hook is modified by putting a web in the cable eye to define a smaller hole through which a hoisting cable will slidably pass but its ferruled end will not pass. The web has the additional advantage in that if the ferruled end of a hoisting cable breaks, as it commonly does, that end may be knotted in the field and my ender still used, as the knot may be carried on the surface of the web from where it may readily be removed with a punch or similar device when necessary. Commonly with other enders of the present day if a cable end is knotted to fasten the ender to the end of a hoisting cable, the knotted portion may not be readily removed, especially in the field, and oftentimes it is necessary to transport the structure to a distant shop for removable of the knotted portion of the cable therefrom.

My invention differs from the prior art not in any one of these features per se, but rather in the synergistic combination of all of them that uniquely provide the functions described.

SUMMARY OF INVENTION

My invention generally provides a choker hook having a cable eye portion angularly related to a peripherally defined cylindrical body. The body defines a skewed key-hole type fastening slot to receive and releasably maintain the ferruled end of a choker cable. The interior of the body provides an angled stop opposite the entry orifice of the choker fastening slot to require the ferruled end of a choker cable to be initially positioned with that end facing and against the stop and thereafter moved through a three dimensional angle of approximately 180 degrees to be finally positioned in a fastened state against the body cylinder bottom, to make accidental dislodgement of the choker cable very improbable but yet allow ready release when there be slack between the choker hook and choker cable. The various surfaces of the choker hook that may contact the cable are rounded to prevent cable damage or kinking and the cable eye is of sufficient size to allow easy slidable motion along a hauling cable.

The ender of my invention provides the same essential structure as a choker hook but with the addition of a fastening plate in the cable eye that defines an orifice of size to allow sliding motion of a hauling cable therein but not allow passage of a hauling cable ferrule therethrough. The fastening plate is shaped to also allow fastening upon the end of a hauling cable that is knotted rather than ferruled.

In creating such a device it is:

A principal object of my invention to provide a choker hook for logging rigging that releasably fastens the ferruled end of a choker cable in a three dimensional key-type slot with a stop at a spaced distance inwardly of its orifice to require a unique motion of the ferruled choker cable end to cause fastening and thusly aid in preventing accidental release of a choker cable.

A further object of my invention to provide such a device that allows simple and easy manipulation for fastening of the choker cable and for its unfastening when there be slack between the choker cable end and the choker hook.

A still further object of my invention to provide such a device that has a body with rounded edges to prevent cable damage or kinking and one with an eye structure angularly related to the body to allow grouping of a plurality of choker hooks on a hauling cable inwardly adjacent an ender.

A still further object of my invention to provide an ender that comprises a choker hook with a fastening plate in the hauling cable eye structure.

A still further object of my invention to provide such an ender with a web-like fastening plate so that it may fasten either a ferruled or a knotted end of a hauling cable and allow simple release of either.

A still further object of my invention to provide such devices that are of a new and novel design, of rugged and durable nature, of simple and economic manufacture and otherwise well suited to the uses and purposes for which they are intended.

Other and further objects of my invention will appear from the following specification and accompanying drawings which form a part hereof. In carrying out the objects of my invention, however, it is to be understood that its essential features are susceptible of change in design and structural arrangement with only one preferred and practical embodiment being illustrated in the accompanying drawings as is required.

BRIEF DESCRIPTION OF DRAWINGS

In the accompanying drawings which form a part hereof and wherein like numbers of reference referred to similar parts throughout.

DESCRIPTION OF THE PREFERRED EMBODIMENT

My invention generally provides a choker hook having cable eye 20 angularly and structurally joined with peripherally defined cylindrical body 21 which defines choker fastening slot 22 in its periphery. My ender provides the same choker hook with fastening structure 23 carried in the eye of the device.

Cable eye 20 and body 21 are both integral parts of a unitary choker hook and generally both are formed unitarily by casting or otherwise. Although it is convenient for purposes of discussion and description to separate these elements, their unitary nature should be remembered as neither would be functional without the other.

Figure 5:
FIG. 5 is a horizontal cross-sectional view through the right periphery of the cable eye of the device of FIG. 1, taken on the line 5—5 thereon in the direction indicated by the arrows.
Figure 4:
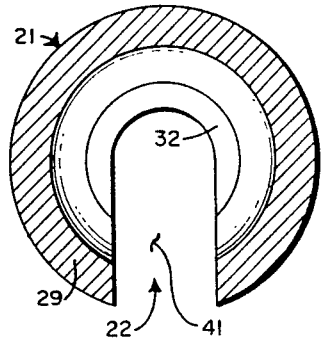
FIG. 4 is a horizontal cross-sectional view through the body of the device of FIG. 1, taken on the line 4—4 thereon in the direction indicated by the arrows.

Cable eye 20 provides rigid annular peripheral element 24 formed as a closed curve to define an ovoid hauling cable eye 25. The peripheral element has rounded forward edge 26 and rearward edge 27 both generally of somewhat greater thickness then medial body portion 28 which in cross-section defines a somewhat curvilinear band with its medial portion extending inwardmost as seen particularly in FIG. 5. This shape is desirable in a choker hook as it presents rather gently curved areas on surfaces that commonly contact a pulling cable carried within the eye to tend to prevent kinking or excessive wear of that cable. In addition the curvilinear exterior shape tends to prevent the device from becoming fouled on external objects over or about which the hook passes during log hauling operations.

The size and shape of the hook eye are not particularly critical so long as the general configurational requirements aforesaid are met. In general it is preferred to form the eye in a somewhat ovoid configuration with a minor diameter several times the diametrical dimension of a hauling cable to be carried within the eye. Medial band 28 should have some appreciable width, generally about three to four times the diameter of a hauling cable on which the eye is to be carried. This dimensioning with ordinary cast steel formation, will normally provide a choker hook eye both of appropriate strength and of appropriate configuration to meet the requirements set forth.

Choker hook body 21 provides peripherally defined, cylindrical portion 29 with curvilinear transition portion 30 communicating with eye 20 in the upper part and beveled portion 31 in its lower part. The body defines medial internal chamber 37. The lower beveled part structurally supports planar bottom disk 32. Upper transition portion 30 provides a smooth curvilinear transition between annular eye element 20 and the cylindrical body element. The lower beveled portion in its diametrically smallest part must be somewhat larger in diameter than the width of a cable slot to be defined in the body to be functional. Both elements configured are substantially as defined in the drawings which appear at approximately full scale for an average choker hook handling approximately ⅝ inch cable.

Figure 1:
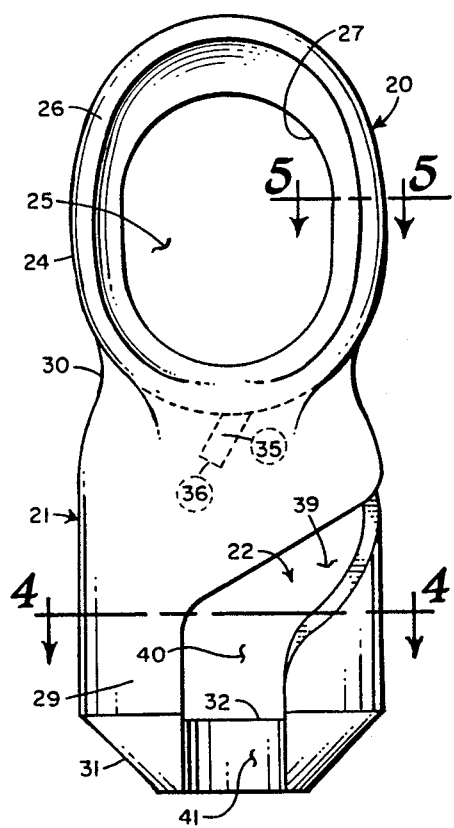
FIG. 1 is an orthographic front view of my choker hook showing its various parts, their configuration and relationship.
Figure 6:
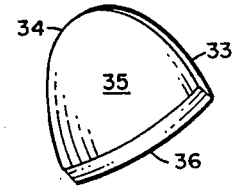
FIG. 6 is an isometric view of the choker ferrule stop, isolated to show its structural details.
Figure 2:
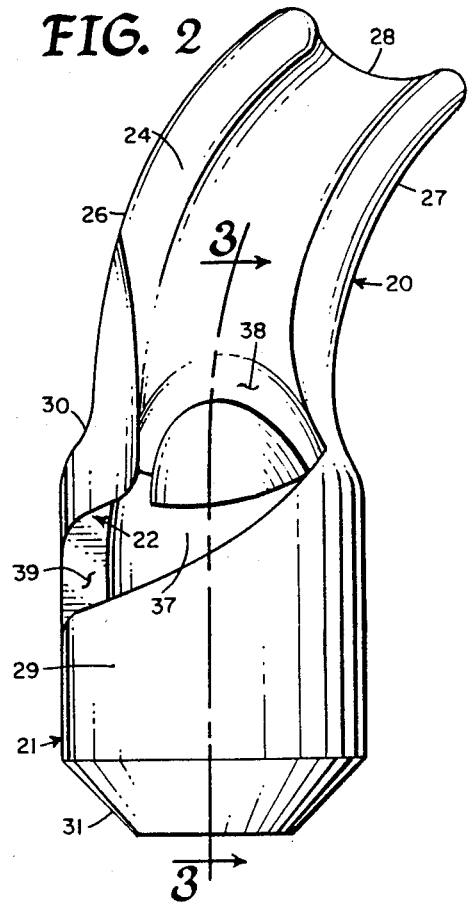
FIG. 2 is an orthographic right side view of the choker hook of FIG. 1 showing its details from this aspect.

Ferrule stop 33 is a somewhat curvilinear sheet-like element illustrated particularly in FIG. 6. Its upper portion 34 is structurally carried by the lower surface of cable eye 20 with body portion 35 extending angularly downwardly therefrom in body chamber 37. The stop is positioned as shown particularly in FIGS. 1 and 2, at a spaced distance inwardly from ferrule entry orifice 38 so that it prevents the entry of a ferrule therepast, as more particularly described hereinafter. Lower edge 36 of the ferrule stop cannot extend downwardly too far below the lower portion of the ferrule entry orifice to allow proper entry of the ferrule into its fastening channel.

Choker fastening slot 22 is defined in the vertical part of peripheral body 21 element. It provides larger entry orifice 38 defined in the side of vertical body 29 at a point where that body communicates with the side portion cable eye structure 22. The entry orifice communicates with angled cable slot 39 defined to extend downwardly and forwardly to a position in the medial part of the body that is approximately 90 degrees in a horizontal plane from the entry orifice. Vertical slot portion 40 extends vertically downwardly from the angled slot portion, through the bottom of lowered beveled part 31 of the body. Horizontal slot 41 is defined in bottom disk 32 communicating from slot 40 to a point slightly past the mid portion of the bottom disk, that is, the point at which the axis of cylindrical body part 29 would intersect bottom disk 32, so that when a choker cable be carried in slot 41 its axis may be coincident with the geometrical axis of body cylinder 29. This slot 38, 39, 40, 41 is slightly wider than the external diameter of a choker cable to be carried therein, but only very slightly larger to allow a sliding fit, and at the same time smaller than the diameter of a ferrule carried by a choker cable end so that the choker cable may be moved freely along the slot but yet its ferruled end may not pass therethrough.

Figure 3:
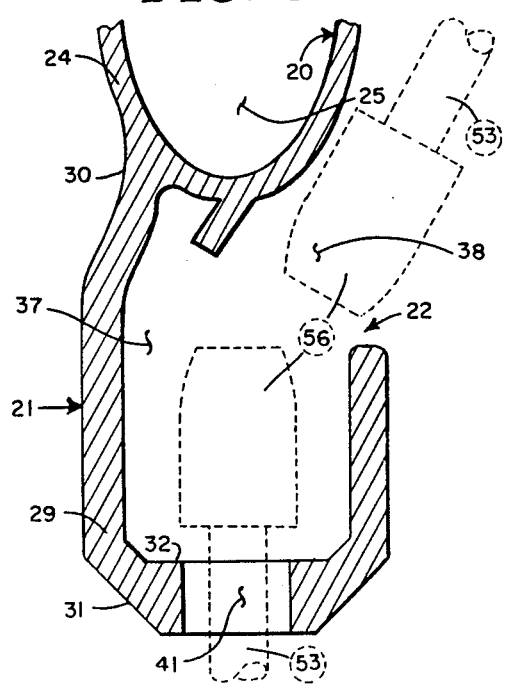
FIG. 3 is a partial cross-sectional view of the choker hook of FIG. 2, taken on the line 3—3 thereon in the direction indicated by the arrows.

Entry orifice 38 is somewhat larger than the external diameter of a ferrule of a choker cable so that that ferrule may enter into internal chamber 37 defined by body 21. Entry orifice 38 is of a curvilinear peripheral shape such that its upper surface is substantially coincident with the lower surface of cable eye 20, or more properly the lower surface of peripheral element 24 forming that cable eye 20, all as illustrated particularly in FIGS. 2 and 3 of the drawings. The various edges of the choker cable slot are rounded to aid in preventing damage or kinking of a choker cable carried therein.

The positioning of ferrule stop 33 is fairly critical. This stop must be positioned so that its lower portion slopes downwardly and away from entry orifice 38 of the choker fastening slot and it must be positioned at a spaced distance inwardly from that slot such that when the end portion of a choker cable ferrule contacts the ferrule stop, the rearward portion of the ferrule will be immediately inwardly adjacent the inner surface of body 29 wherein entry orifice 38 is defined. This configurational requirement is substantially as illustrated in the appended drawings for use with a normal ⅝ inch cable ferrule. The dimensioning and configuration may be appropriately modified in accordance with this specification to accommodate various cable diameters and ferrule configurations.

Figure 7:
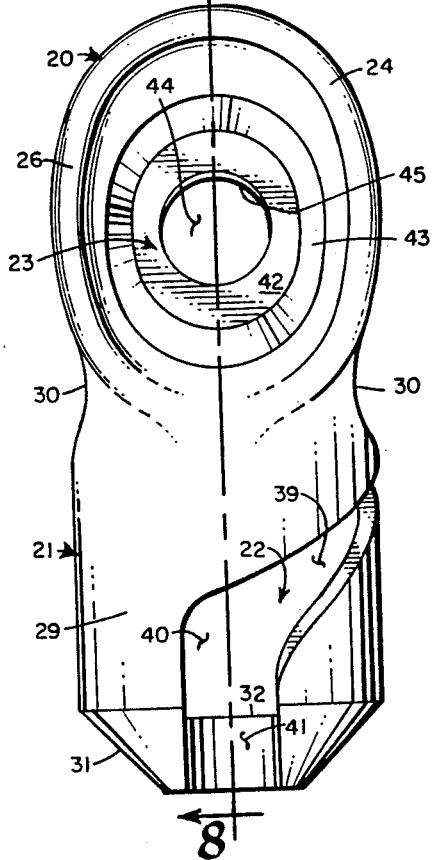
FIG. 7 is an orthographic front view of an ender of my invention showing particularly the fastening plate.
Figure 8:
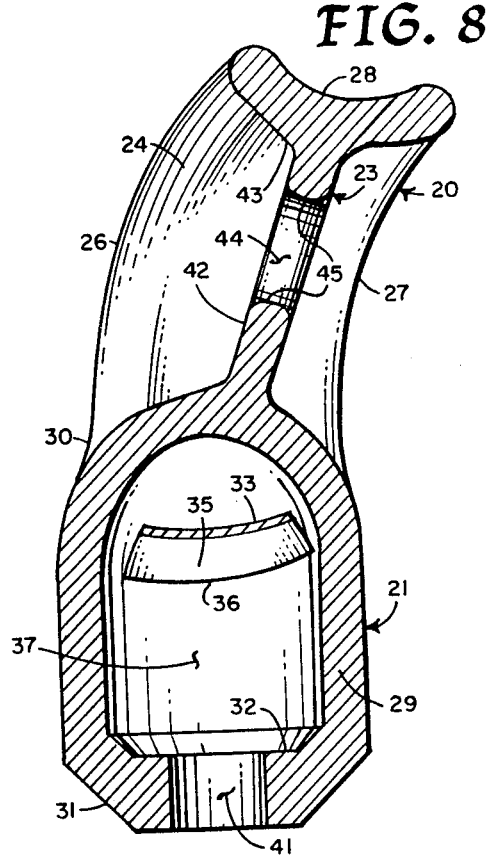
FIG. 8 is an orthographic vertical cross-sectional view of the device of FIG. 7, taken on the line 8—8 thereon in the direction indicated by the arrows.

The ender structure and ender fastening plate 23 are illustrated particularly in FIGS. 7 and 8 of the drawings. The ender structure is formed similarly to a choker hook, as heretofore described, except that in addition it has ender fastening plate 23 embodied in the eye structure thereof.

Ender fastening plate 23 defines a web-like structure having an external periphery 42 configured to structurally communicate with the inner surface of cable eye 20. Body 43 of the fastening plate in its medial part defines cable orifice 44 having rounded edges 45. The configuration of the cable orifice is generally circular and its size is such as to allow free passage of a hauling cable but yet prevent the passage of a ferrule or knotted portion of the hauling cable therethrough. In general its diameter is only very slightly larger than that of the hauling cable with which it is to be used. The conical shape of the ender fastening plate particularly adapts it for used with knotted hauling cables, which commonly are used in the logging industry when a ferrule breaks from a hauling cable and cannot be readily replaced in the field. In such instances, commonly, a simple overhand knot is established in the hauling cable end and this is used to serve the function of a ferrule. With fastening plates not having peripheral conical configuration such as in my invention, it oftentimes is difficult to remove such a knot from an ender should the hauling cable break therefrom.

The entire ender and choker hook structures described are preferably formed as unitary structures by casting from metal such as mild steel. Other materials may serve the purpose of my invention, if they provide appropriate strength and rigidity, but in general other commercial materials are not within the ambit of reasonable economic use and do not fulfill the purposes of my invention nearly so well as castable mild steel. If my invention be formed of separate parts, the parts are permanently and structurally joined, as illustrated and specified, by welding or similar means providing the same strength and structural integrity.

Having thusly described the structure of my invention, its operation may be understood.

Figure 9:
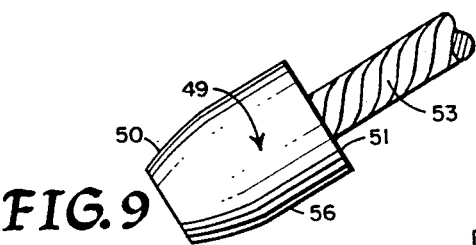
FIG. 9 is an orthographic view of the ferruled end of a typical cable used in logging rigging.
Figure 10:
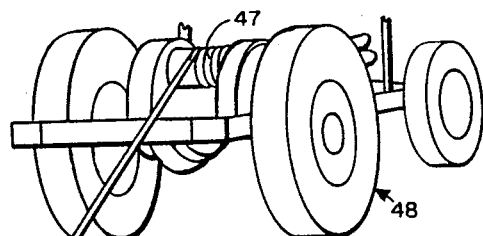
FIG. 10 is a partial, somewhat idealized illustration showing the use of my ender and a plurality of choker hooks.
Figure 10:
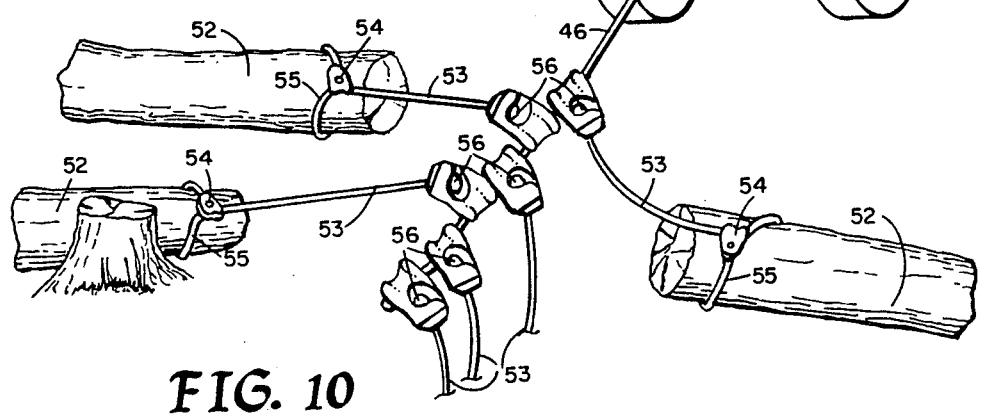

A typical log hauling rigging is illustrated in FIG. 10. Hauling line 46 is carried by winch 47 mounted on vehicle 48, commonly a heal boom or similar winching device. Hauling line 46 is commonly a multi-stranded, spirally wound wire cable of approximately ⅝ inch diameter. The end of the hauling cable is commonly provided with cylindrical ferrule 49 as illustrated in FIG. 9. This ferrule commonly has a tapered outer end portion 50 to allow its easy insertion within orifices and a square rearward shoulder 51 to allow its fastening in various mechanical devices.

Such a rigging is used to transport a plurality of cut logs 52 to a central loading or decking area where they may be further transported or processed. Commonly such logs are attached to main hauling cable 46 by shorter individual choker cables 53 which have some sort of choker fastening device 54 to releasably form a loop 55 about a log to be transported. Generally such choker cables are of slightly less diameter then the hauling cable and are provided with similar ferruled ends 56. Many and various choker cable fastening devices 55 have heretofore become known in the logging arts and any of such known devices may be used with my invention.

To transport logs with my invention, a hauling cable having a ferruled end is provided with an ender structure, immediately inwardly adjacent its ferruled end part, by placing the ender over the foreward end of the hauling cable so that that cable passes through cable orifice 44 defined in fastening plate body 43 of that ender structure. A plurality of choker hooks are then established upon the hauling cable, inwardly adjacent the ender, bypassing the hauling cable through their eye structures 20, as illustrated in FIG. 10. The choker hooks once so placed may slidably move upon the hauling cable but may not move rearwardly past the end thereof, since they are prevented from so doing by the ender structure, which in turn is prevented from passing off the end of the hauling cable by its end ferrule 49.

With the ender and choker hooks so placed, individual choker cables 53 are fastened about logs in the normal fashion and the inner ferruled ends of such cables are moved to one of the choker hooks for fastening therein. To accomplish this fastening, the ferruled end 56 of the choker cable is inserted, with its forward tapered portion 50 inwardmost, into entry orifice 38 of the choker fastening slot. The choker cable ferrule is moved inwardly until it contacts ferrule stop 33. The choker cable end is then moved downwardly and toward the front of the choker hook so that the choker cable 53 immediately rearwardly of its ferruled end 56 moves downwardly and forwardly along the downward course of the choker fastening slot. This motion is continued until the choker cable points normally outwardly from the bottom of choker 41 slot and the cable is maintained in that slot by reason of square shoulder 51 of its ferruled end 56 resting immediately above bottom disk 32 of the choker hook body 21. This motion is illustrated in dashed phantom outline in FIG. 3 of the drawings. With the choker cable ferrule in such position and with some tension on that cable, it is maintained in the choker hook. With some slack in the choker line, however, the choker cable may be readily removed from the choker hook by reversing the motion immediately before described.

All log chokers to be hauled are fastened in similar fashion and the hauling cable then winched in so that its end is in the area of vehicle 48 with the attached logs in the immediate vicinity thereof. The logs then may be dealt with for further transport, storage or other handling.

From the foregoing description, it is to be particularly noted that the angular relationship of cable eye 20 to choker hook body 21 allows the hooks to bunch or group immediately adjacent each other and immediately forwardly of the ender, as illustrated in FIG. 10. This grouping tends to allow all choker hooks to move immediately adjacent each other to form an array immediately inward of the ender hook and tends to provide outwardly projecting elements that have a rearwardly extending angle, all to aid in preventing damage to the hauling cable by way of kinking or otherwise and to prevent fouling of choker hooks on various obstacles over which the assemblage much pass during the haulage operation.

It is further to be noted that so long as any tension be maintained on a choker cable fastened in my choker hook, it is impossible for that cable to be accidentally removed from the hook, since to accomplish such removal the choker cable itself, immediately inwardly of the ferruled end, must be reversed at least 90 degrees from its fastening position and this cannot happen accidentally with tension between the choker and choker cable. Thusly my choker hook provides a relatively safe mechanism that is very nearly fool proof in its operation and yet provides a structure that is relatively small of mass and simple of operation.

It is further to be noted that my ender is of the same configuration and structure as a choker hook with the addition of a fastening plate. This fastening plate may be used with either a ferruled end of a hauling cable or, if the hauling cable breaks and re-establishment of a ferrule be not possible, the device may similarly be effectively used with a hauling cable with a knot in its end. If a hauling cable having a knotted end should again break, the knotted end portion may be readily removed from the ender by reason of the configuration of the periphery of the fastening plate which has no crevices or indentations in which a cable may become fastened or engaged.

The foregoing description of my invention is necessarily of a detailed nature so that a specific embodiment of it might be set forth as required, but it is to be understood that various modifications of detail, rearrangement and multiplication or parts might be resorted to without departing from its spirit, essence or scope.

Having thusly described my invention, what I desire to protect by Letters Patent, and what I claim is:

1. A choker hook for logging rigging to releasably fasten a ferruled end of a choker cable on a hauling cable comprising, in combination:

a cable eye structure peripherally defining an eye to slidably fit about a hauling cable;

a peripherally defined cylindrical body, having an upper part and a lower part, defining a medial chamber, carrying the cable eye structure in its upper part, and having a bottom disk in its lower part, said cylindrical body defining an entry orifice communicating with the medial chamber defined by said body, a first slot portion angling downwardly and radially approximately 90 degrees, and a downwardly extending second slot portion communicating with a third horizontal slot defined more than half way through the bottom disk, said first, second and third aforesaid slots having width sufficient to allow slidable motion of a hauling cable therein but insufficient to allow passage of an enlarged end of a hauling cable therethrough; and ferrule stop means carried in the upper part of the medial body chamber by the lower portion of the cable eye structure, said ferrule stop means extending downwardly at an angle away from the entry orifice and being positioned at a spaced distance from the entry orifice, slightly greater than the length of the ferrule on a choker cable to be fastened by the choker hook, to require a choker cable having a ferruled end to be placed in the choker hook with its ferruled end extending inwardly and downwardly through the entry orifice and to the ferrule stop means and then being moved through approximately a 180 degree angle and along the second angled slot to the third slot defined in the bottom disk, with the ferruled end resting on the upper surface of the bottom disk and with the associated cable depending therefrom and through the third slot, all to aid in preventing accidental dislodgement of the choker cable from the choker hook.

2. An ender for a log hauling cable comprising a choker hook as defined in claim 1 with
a web-like fastening plate structurally communicating with the cable eye and defining a hole to slidably carry a hauling cable but not allow passage of an enlarged end of a hauling cable therethrough.

3. A choker hook for a log hauling cable to releasably attach a choker cable having a ferruled end to a hauling cable, comprising, in combination:
a cable eye defined by a peripheral element having rounded edges and configuration to slidably carry a hauling cable;
a peripherally defined cylindrical body structurally communicating by a transition portion at a first end with the peripheral element defining the hauling cable eye, said body angled relative to the cable eye with an obtuse included angle therebetween and carrying a bottom disk in a second end opposite the first end to define a medial chamber;
a choker cable fastening slot defined in the body with an entry orifice, immediately adjacent the communication of the cable eye and the body, configured to allow passage of the ferruled end of a choker cable therein, a first angled slot defined in the body extending angularly downward and radially around the body to communicate with a second slot which in turn communicates with a third horizontal slot defined in the bottom disk to extend past the middle thereof, all said slots having width to slidably receive a choker cable but not allow passage of a ferruled end thereof; and
ferrule stop means, carried within the medial chamber defined by the body, said ferrule stop means structurally communicating with the cable eye and extending at an angle downwardly therefrom at a spaced distance, slightly greater than the length of a ferrule carried by a choker cable to be fastened therein, from the entry orifice, to require a choker cable having a ferruled end to be placed in the choker hook with its ferruled end extending inwardly and downwardly through the entry orifice and to the ferrule stop means and then being moved through approximately a 180 degree angle and along the second angled slot to the third slot defined in the bottom disk with the ferruled end resting on the upper surface of the bottom disk and with the associated cable depending therefrom and through the third slot, all to aid in preventing accidental displacement of the choker cable from the choker hook.

4. The invention of claim 3 further characterized by:
a fastening plate defining a web-like structure, attached to the inner surface of the hauling cable eye and defining a medial hauling cable hole sized to slidably receive a hauling cable but prevent a ferruled end of said cable from passing therethrough.

* * * * *